United States Patent
Biondi et al.

(10) Patent No.: US 6,213,290 B1
(45) Date of Patent: Apr. 10, 2001

(54) OPERATING UNIT

(75) Inventors: Andrea Biondi, Bologna; Fiorenzo Draghetti, Medicina, both of (IT)

(73) Assignee: G.D Societa per Azioni, Bologna (IT)

( * ) Notice: Subject to any disclaimer, the term of this patent is extended or adjusted under 35 U.S.C. 154(b) by 0 days.

(21) Appl. No.: 09/247,760

(22) Filed: Feb. 9, 1999

(30) Foreign Application Priority Data

Feb. 18, 1998 (IT) .............................. B098A0088

(51) Int. Cl.[7] .......................... B65G 47/32; B65G 27/02
(52) U.S. Cl. ....................... 198/740; 198/468.1
(58) Field of Search ................ 198/740, 468.1

(56) References Cited

U.S. PATENT DOCUMENTS

| | | | |
|---|---|---|---|
| 4,051,947 | * 10/1977 | Schumacher et al. | 198/478 |
| 4,548,313 | * 10/1985 | Occhialini et al. | 198/468.1 |
| 4,645,063 | * 2/1987 | Seragnoli | 198/450 |
| 5,547,064 | * 8/1996 | Meyer et al. | 198/468.1 |
| 5,842,558 | * 12/1998 | Spatafora | 198/740 |

FOREIGN PATENT DOCUMENTS

| | | |
|---|---|---|
| 4337413 | 3/1995 | (DE) . |
| 0254958 | 2/1988 | (EP) . |
| 0685392 | 12/1995 | (EP) . |
| 0786297 | 7/1997 | (EP) . |
| 2090804 | 7/1982 | (GB) . |

* cited by examiner

Primary Examiner—Christopher P. Ellis
Assistant Examiner—Mark A. Deuble
(74) Attorney, Agent, or Firm—Ladas & Parry

(57) ABSTRACT

A unit (1) for transferring groups (2) of cigarette packets (3) from a conveyor (4) to an input device (5) of a cartoning machine is provided with a transfer member (18) and an epicyclic gear train (25) for moving the transfer member (18) back and forth along an annular trajectory (T). The cigarette packets (3) are fed along a path (P) by the conveyor (4) and the annular trajectory (T) has a forward portion and a return portion partially overlapping the path (P) of the packet (3) on the conveyor (4). The epicyclic gear train (25) has two gears (48, 49) having a variable transmission ratio (W) for varying the speed of the transfer member (18) along the forward movement of the transfer member (18).

11 Claims, 4 Drawing Sheets

OPERATING UNIT

The present invention relates to an operating unit, and in a particular a product transfer unit.

The present invention may be used to advantage in the tobacco industry, to which the following description refers purely by way of example, for transferring groups of packets of cigarettes, single packets of cigarettes or one or more cigarettes.

BACKGROUND OF THE INVENTION

In the tobacco industry, when considering, for example, groups of packets of cigarettes, units for transferring groups of packets of cigarettes are known, which comprise a transfer member for engaging a conveying path traveled by the groups, and an actuating device for moving and imparting to the transfer member a given trajectory having a forward portion in common with the conveying path. The actuating device normally comprises a main arm rotating with respect to the conveying path of the groups; a secondary arm fitted in rotary manner to the main arm to support the transfer member; and a two-stage epicyclic gear train having a first stage associated with the main arm to mainly impart a given orientation to the transfer member, and a second stage associated with the secondary arm to rotate the secondary arm with respect to the main arm and impart a given-shaped trajectory to the transfer member.

More specifically, in operating units of the above type, the second stage of the actuating device comprises two gears meshing with each other and having a constant transmission ratio determining the shape of the trajectory, which may be elliptical with any predetermined elongation ratio, triangular, square or circular.

The major drawback of known operating units of the above type lies in the fact that such units are very "rigid" in the sense that any given transmission ratio corresponds to a specific trajectory of the transfer member and a specific law of motion (velocity, acceleration, etc.) of the transfer member along such trajectory.

SUMMARY OF THE INVENTION

It is an object of the present invention to provide an operating unit, which is not only straightforward and cheap to produce, but also provides for high degree of flexibility.

According to the present invention, there is provided an operating unit comprising at least one operating device and actuating means having an epicyclic gear train for moving said operating device along an annular trajectory; characterized in that said epicyclic gear train comprises at least one stage having two gears meshing with each other at a variable point of contact and having a transmission ratio varying according to said point of contact.

BRIEF DESCRIPTION OF THE DRAWINGS

The invention will now be described by way of example with reference to the accompanying drawings, in which.

DETAILED DESCRIPTION OF THE INVENTION

Figure 1:
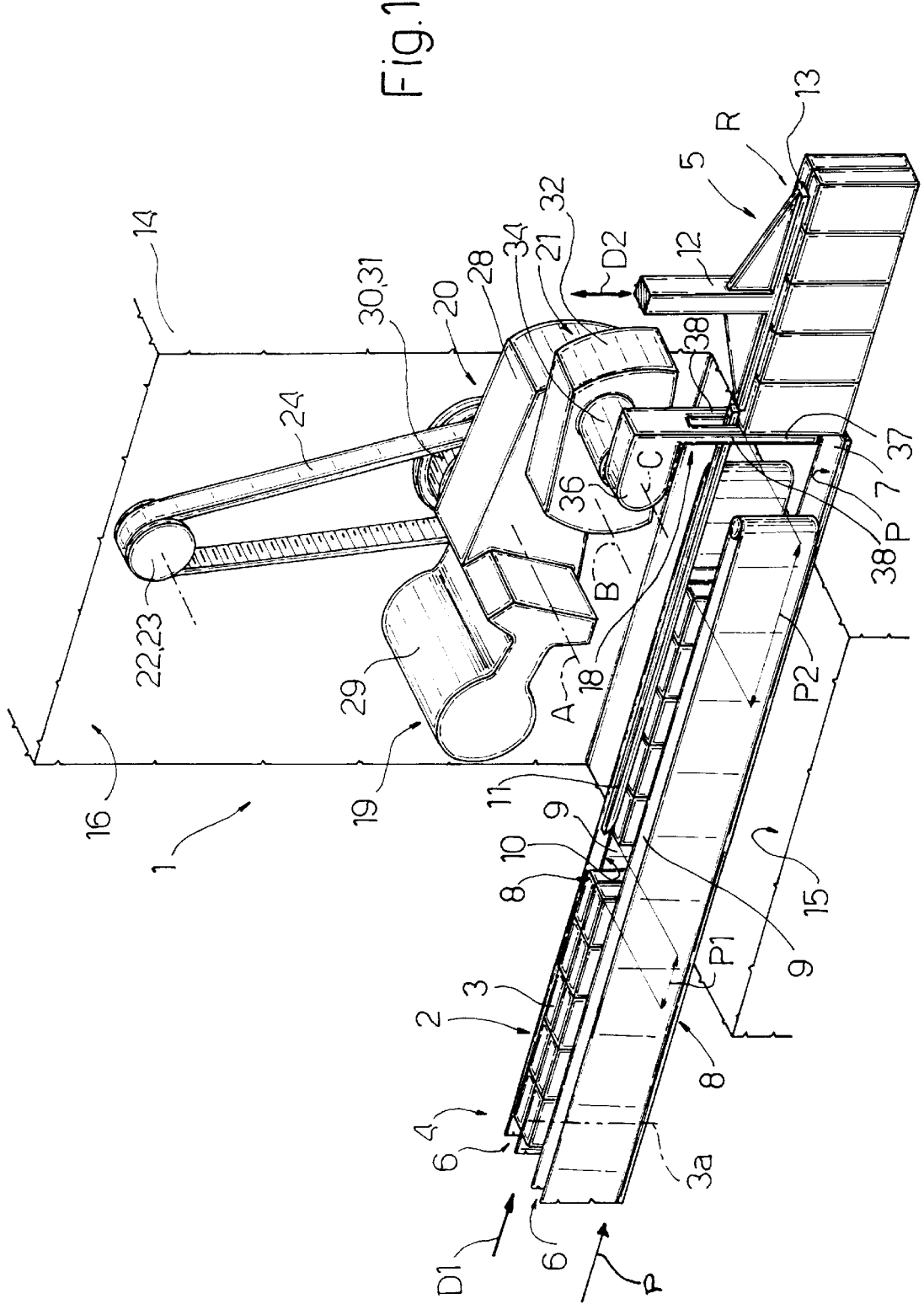
FIG. 1 shows a view in perspective, with parts removed for clarity, of a preferred embodiment of an operating unit in accordance with the teachings of the present invention.

Number 1 in FIG. 1 indicates as a whole a unit for transferring groups 2 of packets 3 of cigarettes fed along a substantially straight conveying path P extending through a supply device 4 for supplying groups 2, and through an input device 5 of a known cartoning machine (not shown). More specifically, each group 2 comprises two side by side rows 6 of side by side packets 3, and is fed along path P with packets 3 oriented with their respective longitudinal axes 3a crosswise to a traveling direction D1.

Supply device 4 comprises a straight horizontal plate 7 extending along path P to define a base along which groups 2 slide; and two endless conveyor belts 8 located over and on either side of plate 7 and on either side of path P, and having respective vertical conveying branches 9 facing each other to define, together with plate 7, a channel 10 along which groups 2 are fed. Device 4 also comprises an elongated horizontal plate 11 fitted horizontally in known manner over plate 7 and for engaging the top of groups 2.

Input device 5 comprises a pusher 12 movable in an unloading direction D2 crosswise to direction D1, and also movable in reciprocating manner through a receiving station R for receiving groups 2 and located at the end of plates 7 and 11. More specifically, pusher 12 comprises a substantially rectangular head 13 for engaging the top of groups 2 and unloading groups 2 from station R onto a head (not shown) of a corresponding counter-pusher not shown in FIG. 1.

Figure 2:
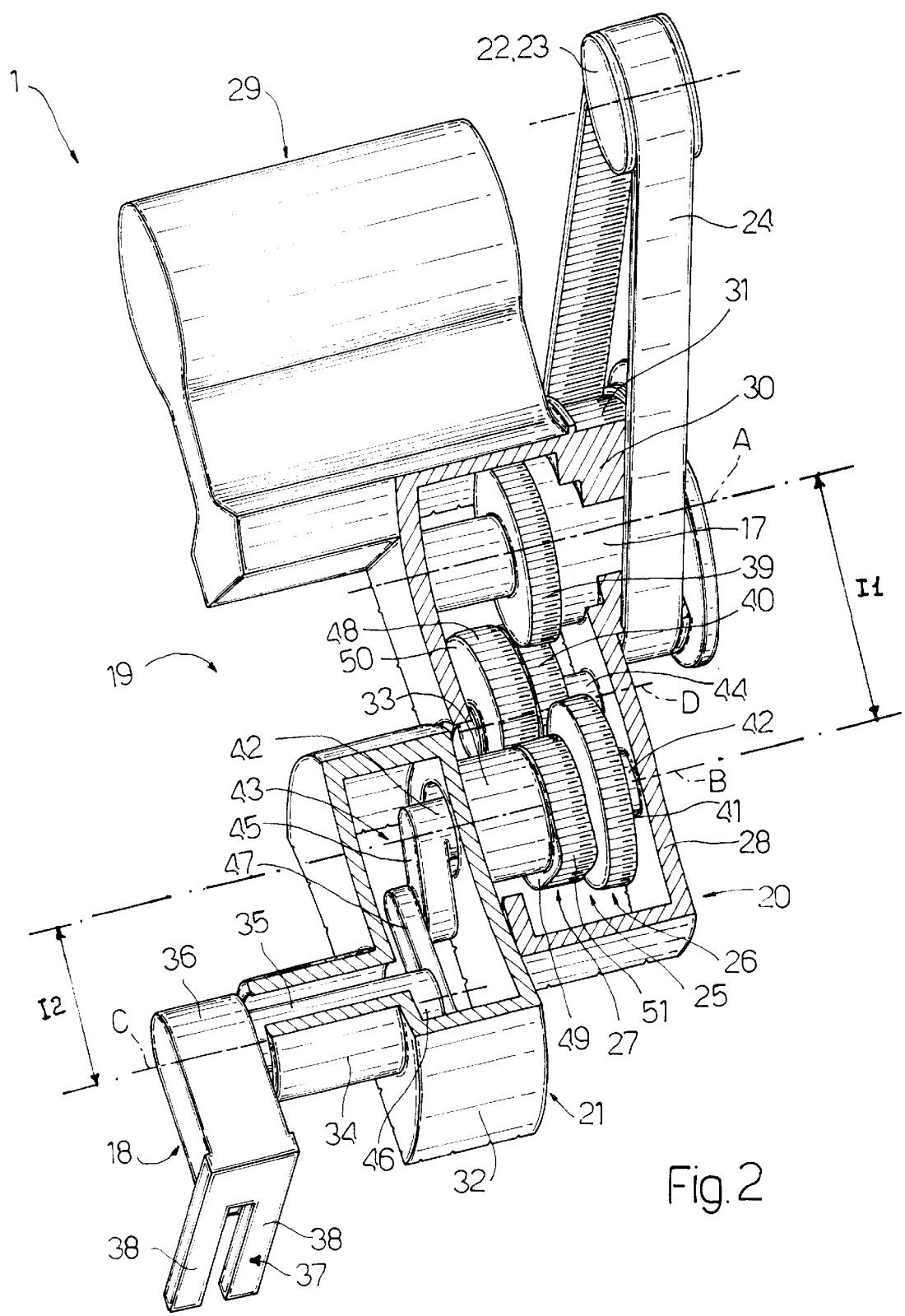
FIG. 2 shows a larger-scale view in perspective, with parts removed for clarity, of a detail of the FIG. 1 unit.
Figure 4:
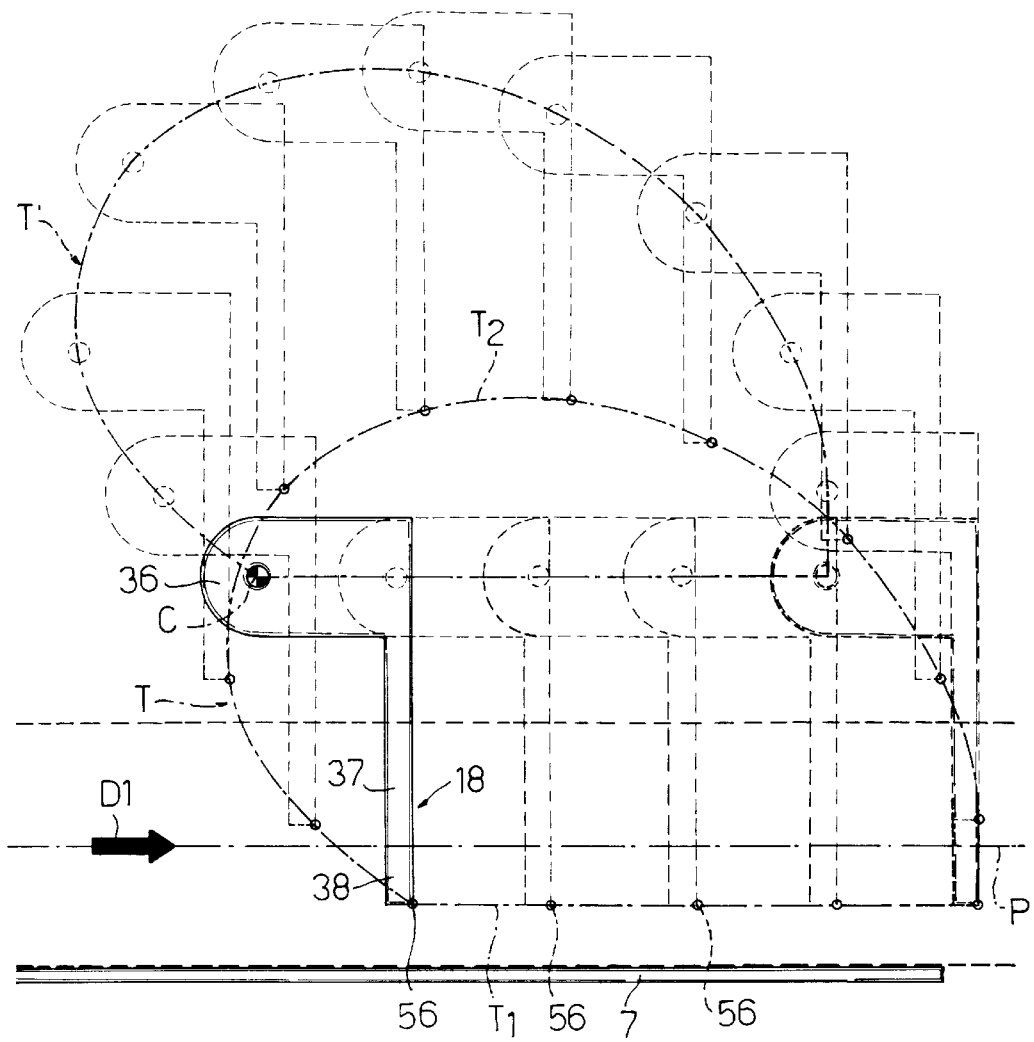
FIG. 4 shows a larger-scale front view of a detail of the FIG. 1 unit in a succession of operating positions.

As shown in FIGS. 1, 2 and 4, transfer unit 1 comprises an L-shaped supporting base 14 having a flat horizontal surface 15 parallel to plate 7, and a vertical front surface 16 crosswise to surface 15. Unit 1 also comprises a fixed shaft 17 projecting from surface 16 and having a horizontal axis A crosswise to surface 16; a transfer member 18 defined by a fork for engaging conveying path P; and an actuating device 19 for moving member 18, and which is fitted to shaft 17 and provides for imparting to member 18 an annular trajectory T having a forward portion T1 in common with path P and extending along channel 10, and a return portion T2 detached from path P.

Actuating device 19 comprises a main arm 20 fitted to shaft 17 so as to rotate about axis A; and a secondary arm 21, which is fitted to arm 20 so as to rotate about an axis B of rotation, is fitted with member 18 on the opposite end to that connected to arm 20, and permits member 18 to rotate about a respective axis C of rotation. More specifically, axis A is a fixed main axis of rotation; axis B is parallel to axes A and C, and rotates anticlockwise, in FIG. 1, about axis A; axis C rotates clockwise, in FIG. 1, about axis B, and travels along a trajectory T' (FIG. 4) identical to but shifted with respect to trajectory T; axes A and B are separated by a distance I1 greater than the distance I2 between axes B and C; and member 18 rotates about axis C and with respect to arm 21, while remaining parallel to itself at any point along trajectory T.

Device 19 also comprises a drive motor 22, an output pulley 23 of which is connected by a toothed belt 24 to main arm 20; and a two-stage epicyclic gear train 25 having a first stage 26 and a second stage 27. First stage 26 is associated with main arm 20, and is connected to member 18 to keep member 18 parallel to itself at all times; and second stage 27 is associated with secondary arm 21 to rotate arm 21 with respect to arm 20 and perform trajectory T of member 18.

More specifically, main arm 20 is located in front of surface 16, and comprises a substantially elongated box member 28 having a counterweight 29 on the opposite side of axis A to box member 28; and a cylindrical tubular member 30, which extends towards surface 16 from member 28, is fitted in rotary manner to shaft 17, and has external teeth 31 meshing with belt 24. Secondary arm 21 is located in front of arm 20, and comprises a substantially elongated box member 32, in turn, having a rear cylindrical tubular portion 33 coaxial with axis B and extending inside member 28, and a front cylindrical tubular portion 34 extending coaxially with axis C and supporting for rotation a shaft 35 integral with member 18. Member 18 is substantially L-shaped, and comprises a portion 36 fitted integrally to shaft 35 and crosswise to axis C; and a push fork 37 fitted transversely to portion 36 and in turn comprising two arms 38, which are insertable inside channel 10, on either side of plate 11, to engage the rear of groups 2.

Figure 3:
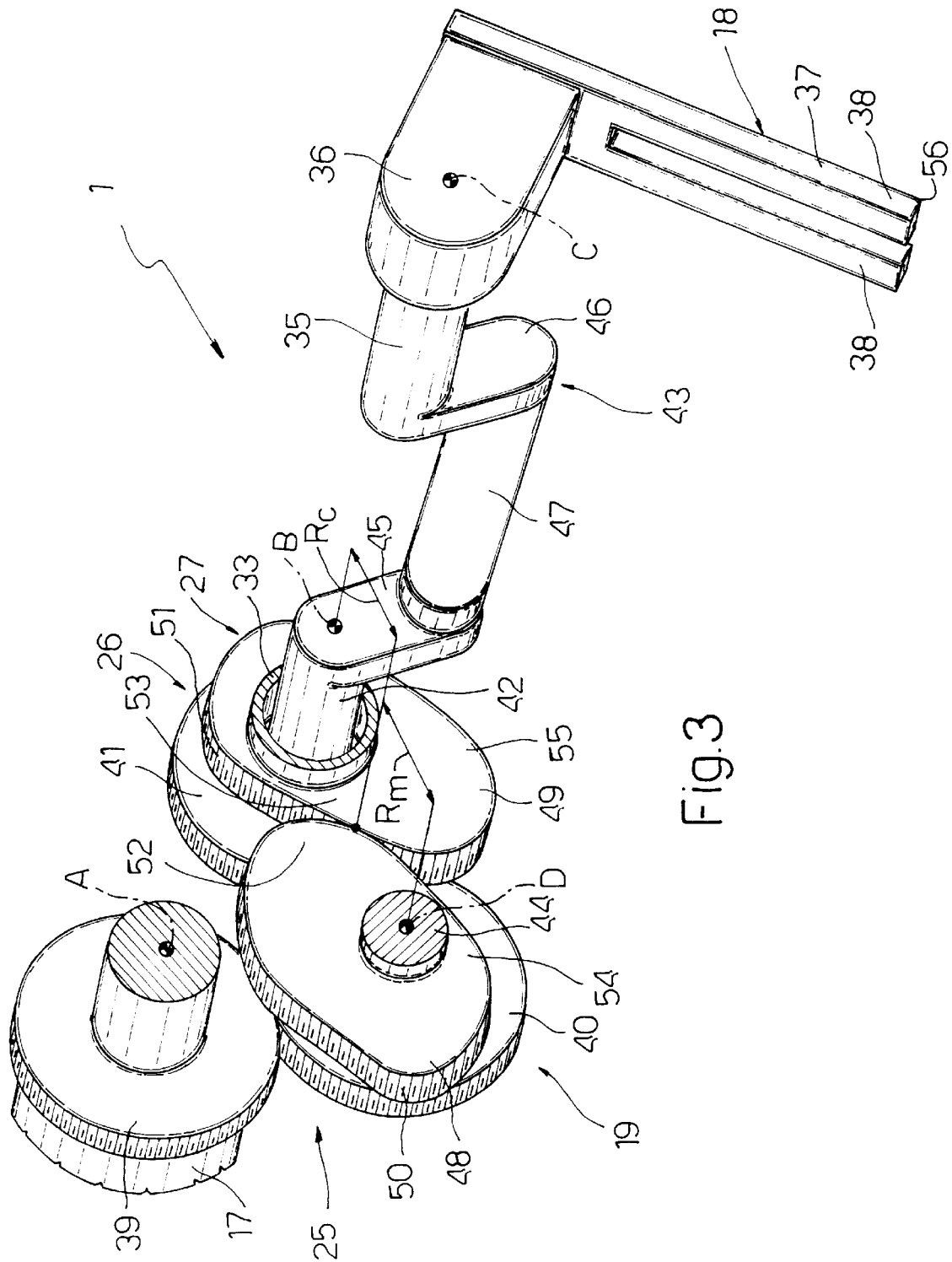
FIG. 3 shows a view in perspective, with parts removed for clarity, of the FIG. 2 detail.

As shown in FIGS. 2 and 3, first stage 26 provides for maintaining member 18 parallel to itself at all times, i.e. with arms 38 of fork 37 perpendicular at all times to direction D1, and comprises three circular gears 39, 40, 41 housed inside member 28. Gear 39 is fitted to a free end of shaft 17; gear 41 is fitted to a shaft 42, which is fitted in rotary manner, parallel to axis B, both to member 28 and through portion 33 of member 32, and is connected to the end of shaft 35 opposite the end integral with member 18 by means of a transmission 43 housed inside member 32; and gear 40 is located in an intermediate position between gears 39 and 41, and is fitted idly to a supporting shaft 44 integral with and extending inside member 28 along an intermediate axis D between and parallel to axes A and B.

Besides cooperating with first stage 26 to keep member 18 parallel to itself at all times, transmission 43 comprises an elongated flange 45 fitted to one end of shaft 42 and crosswise to axis B; a further flange 46 fitted to one end of shaft 35 and crosswise to axis C; and an elongated plate 47 lying in a plane parallel to the planes of flanges 45 and 46, and the opposite ends of which are connected in rotary manner to flanges 45 and 46.

As shown in FIG. 3, second stage 27 rotates secondary arm 21 with respect to main arm 20, cooperates with arm 20 to impart a given shape to trajectory T, and comprises two cam-shaped gears 48 and 49, i.e. having respective variable-radius toothed profiles 50 and 51, which roll one on the other with a transmission ratio W varying according to the point of contact between profiles 50 and 51.

Transmission ratio W is defined by the ratio between the angular speed Wc of driven gear 49 and the angular speed Wm of drive gear 48; varies within a given range; imposes a given movement of member 18; and determines both the shape of trajectory T and the speed V at which member 18 travels along portions T1 and T2 of trajectory T. Speed V comprises a vector component Vd in direction D1 and a vector component Vt crosswise to direction D1, and is also influenced by the ratio between distances I1 and I2, the value of which ratio is so determined at the design stage that the movement of member 18 into contact with groups 2 is such that component Vd is substantially equal to the speed V2 at which groups 2 are fed in direction D1.

Gear 48 is fitted to shaft 44 and located alongside gear 40 to rotate, together with gear 40, about axis D; and gear 49 is fitted in rotary manner to shaft 42, is located alongside gear 41, and is angularly integral with tubular member 33 of box member 32 to rotate member 32 about axis B. More specifically, gears 48 and 49 provide for converting a uniform rotation—generated by gear 40 rotating on gear 39—into a rotation varying in speed according to the value of transmission ratio W, and also provide for orienting secondary arm 21 with respect to main arm 20 to set member 18 to a position disengaging path P along portion T2 of trajectory T.

Gears 48 and 49 have respective variable radii Rm and Rc. Gear 48 comprises at least one portion 52, which meshes with a respective portion 53 of gear 49 and has a radius Rm greater than the radius Rc of portion 53; and at least one portion 54, which meshes with a respective portion 55 of gear 49 and has a radius Rm smaller than radius Rc of portion 55.

The transmission ratio W defined by the ratio between angular speeds Wc and Wm is also equal to the ratio between radii Rm and Rc, so that, when, in use, a portion 53 of gear 49 meshes with a corresponding portion 52 of gear 48, speed Wc is greater than speed Wm; whereas, when, in use, a portion 55 of gear 49 meshes with a corresponding portion 54 of gear 48, speed Wc is less than speed Wm.

In actual use, groups 2, separated from one another by a distance P1, are fed by supply device 4 along path P to transfer unit 1 at a substantially constant linear speed V2 parallel to direction D1. As a group 2, engaged on both sides by belts 8, substantially reaches the vertical to plate 7 through axis A, member 18 engages the rear of group 2 and pushes the group completely into station R, where the group is engaged by head 13 of input device 5 and fed in direction D2 onto said cartoning machine.

The movement of transfer member 18 along trajectory T is determined by the combined rotation of arm 20 about axis A, of member 18 itself about axis C, and of arm 21 about axis B and with respect to arm 20; arm 20 is rotated about axis A by motor 22 operating belt 24; member 18 is rotated about axis C by rotating gear 41 about gear 39 with arm 20 and by means of transmission 43 to maintain member 18 parallel to itself at all times and with fork 37 crosswise to direction D1; and arm 21 is rotated with respect to arm 20 by rotating gear 48 integrally with gear 40, and by the rotation of gear 49 and the variable transmission ratio W between gears 48 and 49 converting the uniform rotation of gear 40 into a variable-speed rotation.

In FIG. 4, trajectory T of member 18 is drawn with reference to the bottommost point 56 of fork 37 of member 18, and the vertical distance between point 56 and plate 7 varies according to the value of transmission ratio W at the point of contact between gears 48 and 49. As stated, the speed V of member 18 along trajectory T also depends on transmission ratio W. In particular:

Along portion T1, which commences substantially at the point at which member 18 comes into contact with a group 2, component Vt remains substantially nil, whereas component Vd passes from an initial value approximating the value of speed V2 of group 2, to an intermediate value greater than the value of speed V2, and eventually to a final value of substantially zero at the end point of portion T1; and each group 2 is intercepted smoothly by member 18, and is accelerated along portion T1, so that, on substantially reaching station R, it is separated from the following group 2 by a distance P2 greater than distance P1.

Along an initial portion of portion T2 immediately following portion T1, member 18 is reversed and component Vt increased; member 18, after first zeroing component Vd, releases group 2 inside station R and disengages itself from group 2 by moving upwards with respect to plate 7 and back to intercept the next group 2; and the withdrawal of member 18 from plate 7 determines a disengaged position of member 18, not only with respect to path P of groups 2, but also with respect to groups 2 themselves, i.e. a position in which point 56 is completely disengaged from groups 2.

Along a final portion of portion T2 just before portion T1, component Vt is directed towards plate 7 to cause member 18 to engage path P; and component Vd assumes values approximating the value of speed V2 to bring member 18 smoothly up to a group 2.

In an embodiment not shown, unit 1 comprises, in place of counterweight 29, a further member 18 and a further pair of arms 20 and 21 to accelerate supply of groups 2 to station R without complicating the structure of unit 1.

In a further embodiment not shown, axes A, B and C of unit 1 are vertical; conveyor belts 8 define a bottom supporting base and a top surface for laterally retaining groups 2; and plates 7 and 11 act as retaining members for groups 2.

As opposed to moving over channel 10, transfer member 18 therefore moves alongside channel 10, and head 13 moves reciprocatingly through station R in a horizontal direction D2.

Owing to the fact that the epicyclic gear train 25 of the actuating device 19 has a stage 27, which comprises two gears 48 and 49 meshing with each other and having a transmission ratio W varying according to the point of contact between the gears 48 and 49, the shape of the trajectory T and the instant speed V of member 18 may be adapted easily to the requirements of supply device 4 and input device 5. In other words, the use of the two gears 48 and 49 having a variable transmission ratio W allows adapting the dynamical features of member 18 (trajectory T and the instant speed V) to the features of supply device 4 and input device 5, instead of adapting the features of supply device 4 and input device 5 to the dynamical features of member 18.

Actuating device 19 may be used to advantage not only in a unit such as unit, but also, for example, in a unit (not shown) for transferring cigarettes from a rod cigarette making machine to a filter fixing machine.

Transfer units of this type are well known in the art and are disclosed, for example, in GB 2,110,065, which is incorporated herein by reference.

GB 2,110,065 discloses a unit for transferring cigarette pieces from a twin rod cigarette making machine to a filter fitting machine, the transfer unit comprising a plurality of heads, each of which is capable of transferring two cigarette pieces, and an actuating device for causing each of said heads to translate along an annular path extending through a pick-up station at the output of the cigarette making machine and a release station at the input of the filter fitting machine. The actuating device comprises an epicyclic gear mechanism having a fixed sun wheel, a driven planet carrier rotatable about an axis coaxial with the sun wheel, and a plurality of planet wheels, each of which is angularly integral with a relevant head.

Owing to the limited degrees of freedom of the aforementioned actuating device, the dynamical features of each head (trajectory and instant speed) do not suit in a perfect manner the requirements of the output of the cigarette making machine and the input of the filter fitting machine. In order to avoid such drawback, U.S. Pat. No. 4,051,947 discloses a transfer unit, in which the actuating device also comprises cam means for modifying the trajectory of each head. The addition of the cam means allows obtaining better trajectories, but causes the complexity, i.e. the cost, of the actuating device to be increased considerably.

In a transfer unit of the type disclosed in GB 2,110,065, an actuating device may be used having an epicyclic gear train comprising two gears angularly meshing each other and having a transmission ratio which varies according to the point of contact between the gears. For example, the aforementioned gears having a variable transmission ratio may be used for coupling each planet wheel to the planet carrier.

An actuating device such as that described above is relatively simple, i.e. inexpensive, and allows fitting the dynamical features of each head (trajectory and the instant speed) to the requirements of the output of the cigarette making machine and the input of the filter fitting machine.

An actuating device comprising an epicyclic gear train having a stage, which comprises two gears meshing each other and having a transmission ratio varying according to the point of contact between the gears may be also used in sharpening units for sharpening the blades of a rotary cutting head arranged at the output of a cigarette making machine for cutting a continuous rod of tobacco formed by such machine. A sharpening unit of this type is disclosed, for example, in U.S. Pat. No. 4,472,900, and comprises a frusto-conical grinding wheel, which is moved along an annular trajectory by an epicyclic gear train, which may be advantageously modified by using therein an actuating device having an epicyclic gear train comprising two gears angularly meshing each other and having a transmission ratio which varies according to the point of contact between the gears.

What is claimed is:

1. An operating unit comprising at least one operating device (18) and actuating means (19) having an epicyclic gear train (25) for moving said operating device (18) along an annular trajectory (T); wherein said epicyclic gear train (25) comprises at least one stage (27) having two gears (48, 49) meshing with each other at a variable point of contact and having a transmission ratio (W) varying according to said point of contact, said operating device (18) comprising a transfer member capable of transferring at least one product (2) along at least a portion (T1) of said annular trajectory (T); said operating unit transferring products (2) from a first conveyor (4) traveling along a first path (P) to a second conveyor (5) traveling along a second path; said annular trajectory (T) comprising a return portion (T2) and a forward portion (T1) partially overlapping with at least said first path (P).

2. A unit as claimed in claim 1, wherein said actuating means (19) comprises a supporting device (21), which supports said operating device (18) and is angularly integral with one of said two gears (48, 49).

3. A unit as claimed in claim 1, wherein said epicyclic gear train (25) comprises at least a first and a second stage (26, 27); said second stage (27) including said two gears (48, 49) meshing with each other with a transmission ratio (W) varying according to the point of contact between the gears (48, 49).

4. A unit as claimed in claim 1, wherein; said transmission ratio (w) being such as to vary a traveling speed (V) of said operating device (18) at least along said forward portion (T1).

5. A unit as claimed in claim 1, wherein said return portion (T2) corresponds to a disengaged portion along which said transfer device (18) is disengaged from said first and second path (P).

6. A unit as claimed in claim 1, wherein said two gears (48, 49) of the second stage (27) convert a uniform rotation into a variable-speed rotation.

7. An operating unit comprising at least one operating device (18) and actuating means (19) having a epicyclic gear train (25) for moving said operating device (18) along an annular trajectory (T); wherein said epicyclic gear train (25) comprises at least a first and a second stage (26, 27); said second stage (27) having two gears (48, 49) meshing with each other at a variable point of contact and having a transmission ratio (W) varying according to said point of contact; said operating device (18) comprising a transfer member capable of transferring at least one product (2) along at least a portion (T1) of said annular trajectory (T); said actuating means (18) comprising a fixed frame (14), a first arm (20) fitted in rotary manner to the frame (14) for rotating about a first axis (A), and a second arm (21) supporting said transfer device (18) and fitted in rotary manner to the first arm (20) for rotating about a second axis (B); said second stage (27) being associated with said second arm (21) for rotating the second arm (21) about said second axis (B).

8. A unit as claimed in claim 7, wherein said secondary arm (21) is angularly integral with one of said two gears (48, 49).

9. A unit as claimed in claim 8, wherein said transfer device (18) is fitted in rotary manner to said secondary arm (21) about a third axis (C).

10. A unit as claimed in claim 9, wherein said first stage (26) is associated with said transfer device (18) for rotating the transfer device (18) about said third axis (C).

11. A unit as claimed in claim 10, wherein said first stage (26) is associated with said transfer device (18) for rotating the transfer device (18) about said third axis (C) for maintaining an orientation of the transfer device (18) fixed with respect to said fixed frame (14).

* * * * *